Figure 1:
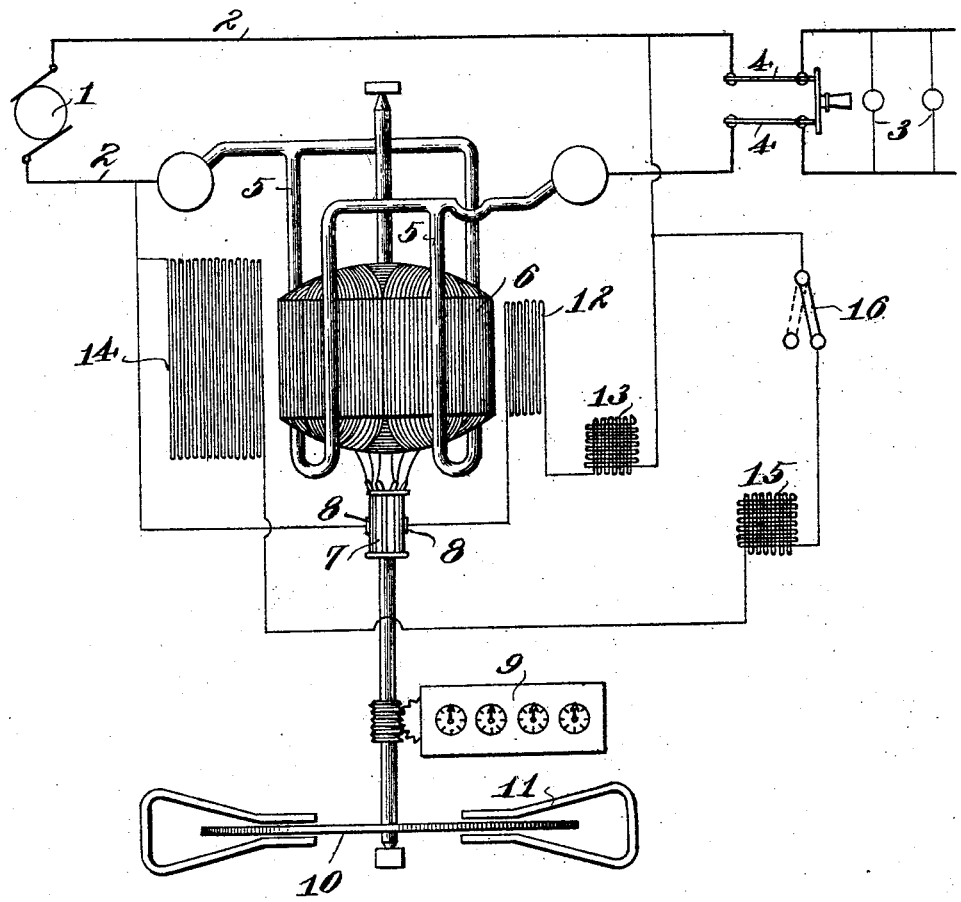

T. DUNCAN.
ELECTRIC METER.
APPLICATION FILED FEB. 1, 1909.

929,123.

Patented July 27, 1909.
3 SHEETS—SHEET 1.

Witnesses:
G. A. Pauberschmidt
Leon F. Stroh

Inventor:
Thomas Duncan,
By G. L. Cragg
Atty

T. DUNCAN.
ELECTRIC METER.
APPLICATION FILED FEB. 1, 1909.

929,123.

Patented July 27, 1909.
3 SHEETS—SHEET 2.

Witnesses:

Inventor
Thomas Duncan,
By G. L. Cragg
Atty

T. DUNCAN.
ELECTRIC METER.
APPLICATION FILED FEB. 1, 1909.
929,123.
Patented July 27, 1909.
3 SHEETS—SHEET 3.
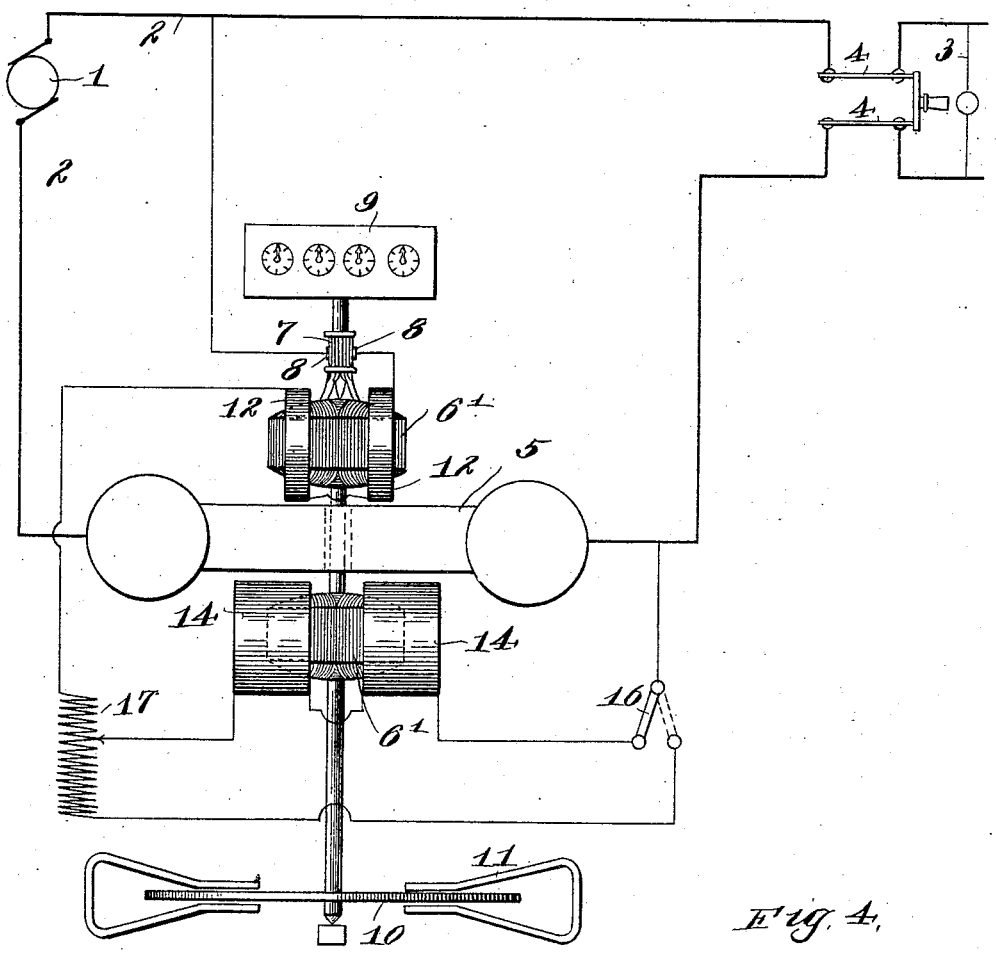
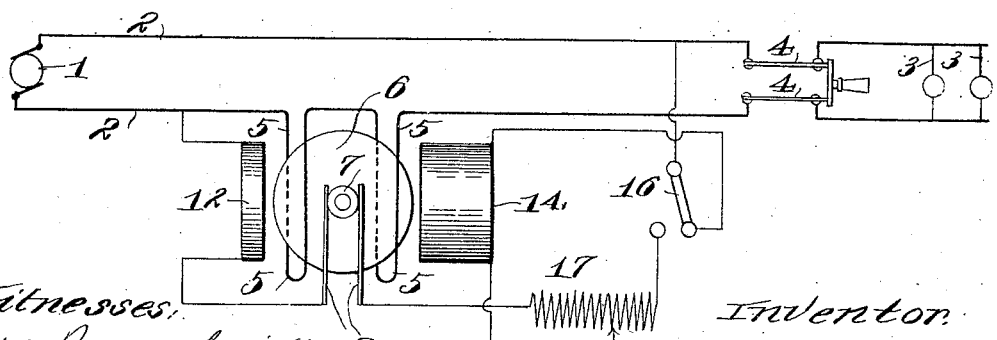

UNITED STATES PATENT OFFICE.

THOMAS DUNCAN, OF LA FAYETTE, INDIANA, ASSIGNOR TO DUNCAN ELECTRIC MANUFACTURING COMPANY, OF LA FAYETTE, INDIANA, A CORPORATION OF INDIANA.

ELECTRIC METER.

No. 929,123.      Specification of Letters Patent.      Patented July 27, 1909.

Application filed February 1, 1909. Serial No. 475,518.

*To all whom it may concern:*

Be it known that I, THOMAS DUNCAN, citizen of the United States, residing at La Fayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to integrating electric wattmeters and is of particular service in connection with such meters that are adapted to the carriage of large currents.

The meter of my invention includes a simple means for calibrating or checking up the accuracy thereof in a short space of time without requiring the use of expensive ammeters and a knowledge of electrical measurements.

It is customary to have the switch-boards of electric lighting and power plants equipped with heavy meters that measure the energy given out from the dynamos, these meters frequently serving to enable the management to observe from time to time just what the total consumption of current in an electric plant is and also the rate of consumption from day to day or week to week, as the case may be. Usually electric lighting and power plants are not equipped with testing instruments large enough to check up these large meters. Let it be supposed that a switch-board is equipped with a five thousand ampere meter whose accuracy is to be checked up. The one who is to do the checking usually lacks the large ampere ammeter for the purpose of checking, though he may be in possession of the necessary volt meter. Moreover, even though the necessary ammeter were at hand, some knowledge of the electrical art would be required for the checking operation.

In accordance with the preferred embodiment of my invention, I employ a supplemental pressure coil which I provide preferably to the exclusion of the main current or series coils, whereby a field is produced which coöperates with the normal pressure circuit of the meter to secure movement of the rotating element of the meter, that should be at a predetermined rate if the meter is in good condition, the voltage with which the meter is impressed being brought to a predetermined value for the purpose.

My invention finds a very important embodiment in direct current watt meters. Where these meters are provided with friction compensating coils, I cause these coils to coöperate with the additional coils that I have provided for testing purposes, to effect the desired movement of the meters when being tested, the armature of each meter being disposed between a starting coil and the testing coil. Where the torque or starting coil is not caused to assist the test coil, said test coil is preferably subdivided into at least two parts, between which the moving element is disposed.

When the test is to be proceeded with, the main current or series coil should preferably be separated from the load, so that the field that coöperates with the main pressure field for testing purposes is sure to be maintained constant during the test, which would not be the case if a load, however slight, were to be permitted upon the system during the test.

I will explain my invention more fully by reference to the accompanying drawings, showing some embodiments thereof.

Figure 2:
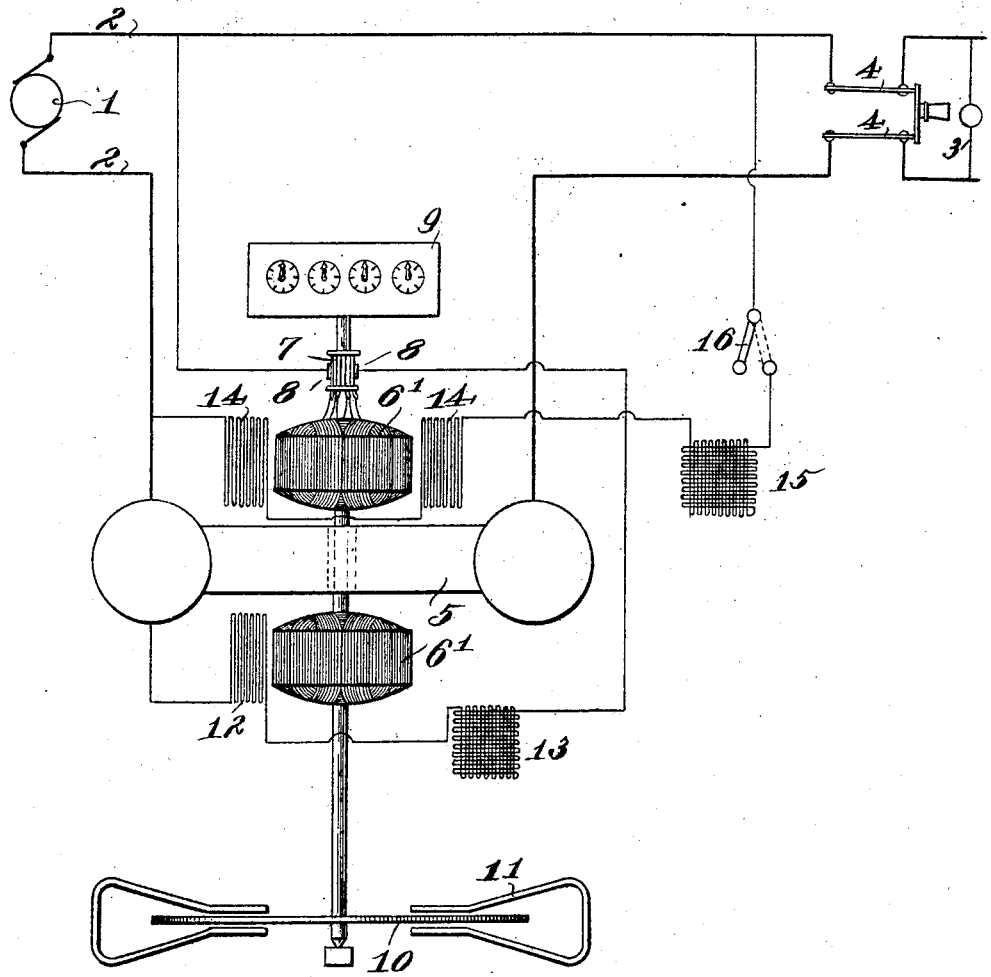

In the drawings—Figure 1 illustrates an integrating watt meter having a single armature, the circuit connections of the various parts of the meter being diagrammatically indicated. Fig. 2 illustrates an astatic integrating watt meter having two armatures, the circuit connections of the various parts of the meter being diagrammatically illustrated. Fig. 3 is a diagrammatic illustration of another adaptation of my invention to astatic integrating watt meters. Fig. 4 is a diagrammatic illustration of another embodiment of my invention.

Like parts are indicated by similar characters of reference throughout the different figures.

In each of the figures I have illustrated a source of suitable current 1, in this instance a source of direct current, connected in circuit with supply mains 2, that are extended to the translating devices 3, that constitute the load supplied with current from the generator 1, a manually controlled switch 4 having members that are serially included in the sides 2 of the circuit, said switch serving to associate the load with and separate it from said source of current. Each of the meters illustrated includes a current or series field conductor element 5, which in power meters is large in size, and a pressure field producing element in the form of a commutated armature 6, to which, however, I do not wish to be limited, this armature being divided into two parts in the embodiment of the invention illustrated in Figs. 2 and 3, in accordance with well known practice, the portions of the armature illustrated in Figs. 2 and 3 being designated as $6^1$. Each of the meters shown is provided with a commutator 7 against which commutator brushes 8 rest, one commutator brush being connected with one main of the system and the companion commutator brush being connected with the other main of the system, whereby the armature coils are subjected to the pressure impressed upon the system, the field produced by an active armature winding and the current field producing portion of the meter effecting movement of the rotating element of the meter proportional to the energy or wattage of the system.

The counting train 9 (Figs. 1, 2 and 3) may be suitably driven by the rotating element of the meter, the motion of said rotating element being suitably retarded as by means of a damping disk 10 arranged within the fields of permanent magnets 11 (Figs. 1, 2 and 3).

Referring now more particularly to Fig. 1, the meter there shown is provided with the usual form of friction compensating or torque coil 12, that is included in the same bridge circuit across the mains 2, which includes the brushes 8 and the extraneous resistance 13, according to common practice. The parts thus far described in connection with the drawings constitute meters as they are adapted for normal service. The parts which I supply to the meter illustrated in Fig. 1 are the testing coil 14, the extraneous resistance 15, and a manually controlled switching device 16, there being suitable connections whereby the switching device 16 may include the test coil 14 in bridge of the mains 2 or exclude said test coil from circuit, said test coil being included in circuit when the meter is to be tested. The manually controlled switching mechanism 4, 16 is provided at the power station and is operated when the meter is to be tested, to dissociate the load 3 from the mains 2, thereby to open circuit through the field portion 5 and to close circuit through that bridge conductor which includes the test coil 14 and the resistance 15, whereby the field produced by the torque coil 12, which never should be sufficient to cause the meter to operate on no load, is supplemented to a predetermined extent by the test coil 14, so that when the voltage impressed upon the system is brought to the requisite value, there should be a predetermined rate of movement of the armature, if the meter is in good working order, there being preferably sufficient resistance in the bridge circuit containing the test coil to make the meter run sufficiently slow, in order that the test may be readily made. If the meter, when being tested, does not run at a suitable speed, simple adjustments known to those at all familiar with meter practice, may be made.

By way of specific example in connection with the arrangement shown in Fig. 1, let it be assumed that the revolutions required to be made by the armature 6 when being tested are ten a minute in number, with a pressure of 110 volts, the switch 4 being opened and the switch 16 being closed. If the magnets have become slightly de-magnetized from any cause, the speed of the meter would be more than ten revolutions, whereupon the attendant, in a very simple way, should adjust the position of the retarding magnets 11, so as to increase the retardation and bring the speed to ten revolutions. When this is accomplished, the meter is correct, the correction not requiring any professional knowledge nor the use of high-priced instruments, nor the sending of an expert to the plant. After the test has been concluded, the switch 4 should be closed and the switch 16 should be opened, thereby to restore the normal circuit relation of the meter with the system.

Thus my simple invention is productive of many advantages which will be readily apparent to those skilled in the art and which I do not believe have hitherto been secured.

While I have supplied the testing coil 14 with current flowing in a second bridge conductor, as illustrated in Fig. 1, I do not wish to be limited to the means whereby said testing coil is supplied with energizing current for testing purposes. The presence of the switch 4 is desirable inasmuch as the test may then be made at any time and inasmuch as assurance is afforded respecting the absence of any load, however slight, and although this is my preferred practice, I do not wish to be limited in all embodiments of the invention to the employment of the switch 4.

The apparatus illustrated in Fig. 2, in so far as the testing facilities are concerned, is generally similar to the apparatus illustrated in Fig. 1. The series or current field portion 5 is differently shaped, the meter illustrated being an astatic meter, the armature being divided into two parts $6^1$ having a common commutator 7.

In the form of the invention shown in Fig. 2, the starting or torque coil 12 is in association with one armature section $6^1$ and the testing coil 14 is divided into two parts between which the companion armature section $6^1$ is disposed. In the form of the invention illustrated in Fig. 2, the starting, friction or torque coil 12 also aids the test coil 14 in its function. In the system of Fig. 2 the test coil 14 is again included in a bridge conductor which is separate from the bridge conductor which includes the armature of the meter. In testing the instrument of the system of Fig. 2, the same operations are preferably performed as in the case of the equipment shown in Fig. 1.

The type of meter illustrated in Fig. 3 is generally similar to the type of meter illustrated in Fig. 2. In Fig. 3 the friction compensating or torque coil 12 is subdivided into two parts that are located in association with the upper armature section $6^1$ while the testing coil, which is divided into two parts 14, is shown in association with the lower armature section $6^1$. The switch 16, in the apparatus of Fig. 3, unlike the switch of Figs. 1 and 2, is always in circuit, there being but one bridge connection with each main, said switch being in permanent connection with the lower main, and in one position serving to include the torque coil 12 only in circuit, together with suitable external resistance indicated at 17, and in the other position, to include the test coils 14 in circuit and in series with the torque coils 12 and a reduced portion of the resistance 17, sufficient resistance at 17 being excluded from the testing coil circuit to equal the resistance of the inserted test coil. By the arrangement shown in Fig. 3, there is but one bridge circuit and the resistance thereof is maintained constant irrespective of the presence or the absence of the test coils in the circuit arrangement.

In the system shown in Fig. 4, the armature is not subdivided as in the systems of Figs. 2 and 3, the current field winding or circuit portion having a shape which is different from that illustrated in Figs. 2 and 3. The circuit relations of the single testing coil shown in Fig. 4 and the single compensating coil are similar to the circuit relations of the double compensating coil and the double testing coil shown in Fig. 3, and I will not specifically describe the circuits of Fig. 4.

The preferred embodiment of the invention is illustrated in Fig. 4, in that the same number of milli-amperes of current are caused to flow through a single shunt or bridge circuit whether the testing coil is present or absent, so that most extreme accuracy is simply and absolutely assured in the testing operation. In the preferred embodiment of the invention, the test coil is not subdivided and is of such a structural shape that it may readily be included within the series field coil or portion, so that there is no materially noticeable change in the physical appearance or make-up of the completed instrument.

In Figs. 2 and 3 each of the coils 12 and each of the coils 14 are supposed to occupy a position, in practice, ninety degrees from the position in which they are illustrated, the coils being shown in their present positions in Figs. 2 and 3 for the sake of clearness.

While I have herein shown and particularly described several embodiments of my invention, I do not wish to be limited to the precise structures shown, as changes may readily be made without departing from the spirit of my invention.

Having thus described my invention, I claim as new and desire to secure by Letters Patent the following:—

1. In a system of electrical distribution, the combination with an integrating watt meter in operative association with a distribution circuit of the system and capable of measuring the energy supplied by said circuit, of a supplemental pressure field winding supplied in addition to those parts of the meter structure that constitute it a meter adapted to measure the energy supplied by said circuit and normally out of coöperative relation with the meter structure to permit of the proper normal operation of the meter and serving, in coöperation with the armature of the meter, to operate the meter to test the meter speed, and manually controlled switching mechanism for bringing said supplemental pressure field winding into and out of operating relation with the meter armature.

2. A system of electrical distribution including an integrating watt meter in operative association with a distribution circuit of the system and capable of measuring the energy supplied by said circuit, the meter being supplied with a supplemental pressure field winding normally forming no field coil portion of the meter, and manually controlled means for bringing said supplemental pressure field winding into and out of operating relation with the meter armature, in order that the meter may be operated to test its speed.

3. In a system of electrical distribution, the combination with an integrating watt meter in operative association with a distribution circuit of the system and capable of measuring the energy supplied by said circuit, of a supplemental test field winding supplied in addition to those parts of the meter structure that constitute it a meter adapted to measure the energy supplied by said circuit and normally out of coöperative relation with the meter structure to permit of the proper normal operation of the meter and serving, in coöperation with the armature of the meter, to operate the meter to test the meter speed, and manually controlled switching mechanism for bringing said supplemental field winding into and out of operating relation with the meter armature.

4. A system of electrical distribution including an integrating watt meter in operative association with a distribution circuit of the system and capable of measuring the energy supplied by said circuit, the meter being supplied with a supplemental field winding normally forming no field coil portion of the meter, and manually controlled means for bringing said supplemental field winding into and out of operating relation with the meter armature, in order that the meter may be operated to test its speed.

In witness whereof, I hereunto subscribe my name this 28th day of January A. D., 1909.

THOMAS DUNCAN.

Witnesses:
 LEON G. STROH,
 C. L. CRAGG.